Patented May 17, 1932

1,858,627

UNITED STATES PATENT OFFICE

ERNST KORTEN, OF FECHENHEIM, NEAR FRANKFORT-ON-THE-MAIN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PROCESS FOR MANUFACTURING AR-TETRAHYDRONAPHTHOLS AND THEIR ESTERS

No Drawing. Application filed November 19, 1928, Serial No. 320,540, and in Germany November 21, 1927.

The present invention relates to a process of manufacturing ar-tetrahydronaphthols and their esters and to the new ar-tetrahydronaphthol esters obtainable thereby.

I have found that by treating naphtholesters of the general formula:

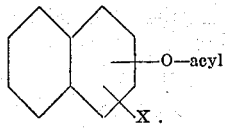

wherein X stands for hydrogen or a monovalent substituent, with hydrogen in the presence of a base metal hydrogenation catalyst in a smooth reaction and practically without the formation of by-products ar-tetrahydronaphtholesters are obtained corresponding to the general formula:

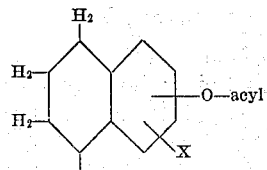

wherein X stands for hydrogen or a monovalent substituent. The result of this process is a most unexpected one, because generally, when directly hydrogenating naphthols, the nucleus containing the hydroxy group is hydrogenated, and on the other hand, when hydrogenating in presence of a noble metal hydrogenation catalyst, entirely hydrogenated products are obtained. My process of hydrogenation is advantageously carried out in the presence of an organic diluent. When saponifying the ar-tetrahydronaphtholesters obtained according to my process in the usual manner, the corresponding ar-tetrahydronaphthols of the general formula:

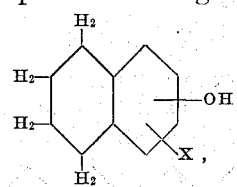

wherein X stands for hydrogen or a monovalent substituent, are obtained.

The ar-tetrahydronaphtholesters as well as the corresponding ar-tetrahydronaphthols may be used as intermediates for the production of dyestuffs and of pharmaceutical products.

In order to further illustrate my invention the following examples are given, the parts being by weight and all temperatures in centigrade degrees, but I wish it to be understood that my invention is not limited to the particular products or reacting conditions mentioned therein.

Example 1

100 parts of pure acetic acid-α-naphthylester of the formula:

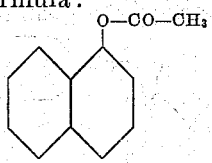

are treated with 2 parts of a nickel containing catalyst previously reduced by means of hydrogen, under a hydrogen pressure of 30–80 atmospheres while well stirring. The absorption of hydrogen already begins below 100°. At the end of the reaction the temperature is advantageously raised to about 110°. When an amount of hydrogen corresponding to 2 molecules is absorbed, the reaction product is separated from the catalyst while still warm and distilled in vacuo. After small first-runnings have passed over, the main-product distills at 142–144° under a pressure of 10 mm. It is the new acetate of ar-1-hydroxy-tetrahydronaphthalene of the formula

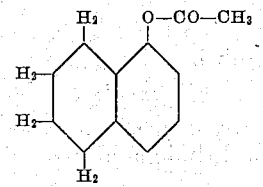

It has the form of snow-white crystals melting at 73–75°.

When warmed with a dilute caustic soda solution, it dissolves after a short time because of being saponified. From the colorless solution the sodium salt of ar-1-hydroxy-tetra-hydronaphthalene separates in snow-white crystals. By acidifying, the free ar-1-hydroxy-tetrahydronaphthalene of the formula

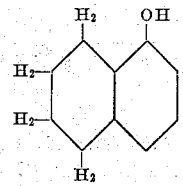

is obtained. It melts at about 68° as described in Liebig's Annalen, vol. 426, page 150.

*Example 2*

When acetic acid-β-naphthylester of the formula

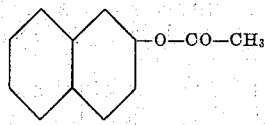

is treated according to Example 1, ar-2-hydroxy-tetrahydronaphthalene and its acetic acid ester are obtained both of which compounds are already described in Liebig's Annalen, vol. 426, page 119.

*Example 3*

When in Example 1 the acetic acid ester of α-naphthol is replaced by the corresponding benzoic acid ester of the formula:

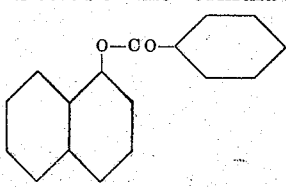

the new benzoic acid ester of ar-1-hydroxy-tetrahydronaphthalene is obtained in a smooth reaction. It corresponds to the formula:

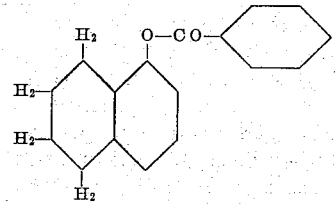

and crystallizes from benzine or methylalcohol in small brilliant tablets melting at about 46°.

By saponifying, it yields ar-1-hydroxy-tetrahydronaphthalene.

*Example 4*

150 parts of the acetic acid ester of the 2-hydroxy-3-naphthoic acid methylester of the formula:

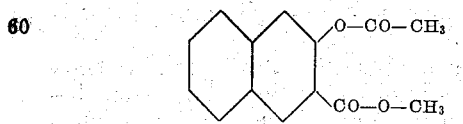

100 parts of decahydro-naphthalene and 2.5 parts of a catalyst containing nickel and pumice are heated to 100–110° in an autoclave provided with a stirrer, while introducing hydrogen. The absorption of hydrogen occurs very smoothly at 30–50 atmospheres and is stopped, when 2 molecules are taken up. The new acetic acid ester of ar-2-hydroxy-tetrahydronaphthalene-3-carboxylic-acid methylester thus obtained, corresponding to the formula:

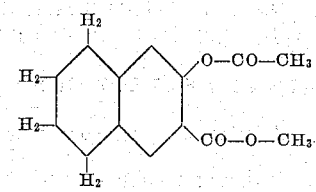

crystallizes from benzine, dilute methyl alcohol or dilute acetic acid in white brilliant needles melting at about 94° and boils under a pressure of 5 mm. at about 193°.

It yields, when saponified, the 2-hydroxy-ar-tetrahydro-naphthalene-3-carboxylic acid of the formula:

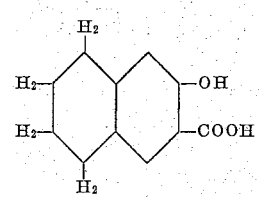

melting at about 176° as described in Liebig's Annalen, vol. 426, page 147.

*Example 5*

95 parts of the acetic acid ester of 2-hydroxy-3-naphthoic acid ethyl-ester, 50 parts of decahydro-naphthalene and 2 parts of a reduced catalyst containing nickel, kieselguhr and 15% of cerium are heated in an autoclave provided with a stirrer under a hydrogen pressure of about 30 atmospheres. The absorption occurs violently already at about 80°. When the reaction is finished, the catalyst is separated and the filtrate, made alkaline by the addition of a caustic soda solution, is distilled by means of steam. The distillation residue yields the same 2-hydroxy-tetrahydronaphthalene-3-carboxylic acid as described in Example 4.

Also other nuclear substitution products of naphtholesters such as 1.2-carbonyl-amino-naphthol (Journal für prakt. Chemie, vol. 92, page 2581) may be subjected to the same process, yielding correspondingly hydrogenated products.

*Example 6*

80 parts of the carbonic acid ester of α-naphthol corresponding to the formula:

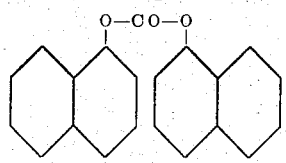

10 parts of deca-hydronaphthalene and 1.2 parts of a reduced catalyst containing nickel and pumice are stirred in an autoclave under a hydrogen pressure of 20–30 atmospheres. The absorption of hydrogen begins at about 85° and is stopped when the amount calculated for 4 molecules is introduced. The reaction mass is worked up as described in the foregoing examples. The new carbonic acid ester of 1-hydroxy-ar-tetrahydronaphthalene of the formula:

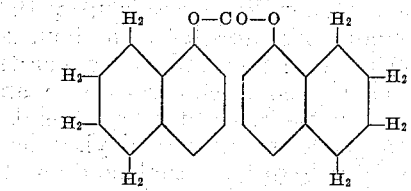

crystallizes from benzine and methylalcohol in colorless microscopic prisms of 114° melting point. It yields, when saponofied, the 1-hydroxy-ar-tetrahydronaphthalene mentioned above.

*Example 7*

When in Example 6 the carbonic acid ester of α-naphthol is replaced by the corresponding β-naphtholester, the new carbonic acid ester of 2-hydroxy-ar-tetrahydronaphthalene is obtained in a likely smooth reaction. It corresponds to the formula:

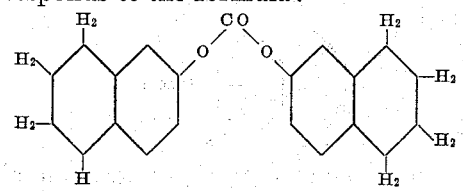

and crystallizes from benzine, methylalcohol or glacial acetic acid in small colorless flat leaflets melting at about 106°.

*Example 8*

The acetic acid ester of 1-methyl-2-hydroxy-naphthalene of the formula:

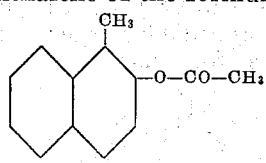

of 66° melting point (see Berichte der deutsch. chem. Gesellschaft, vol. 39, page 442) is hydrogenated as described in Example 1. The reaction product is worked up by filtration and distillation in vacuo. The main fraction boils under a pressure of 9 mm. at about 156°. It represents the new acetic acid ester of ar-1-methyl-2-hydroxy-tetrahydronaphthalene of the formula:

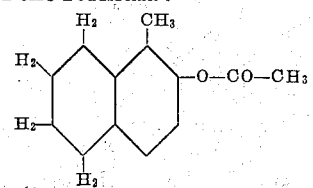

and shows nearly the same properties as the product described in Example 2.

I claim:

1. A process which comprises treating naphthol esters of the general formula:

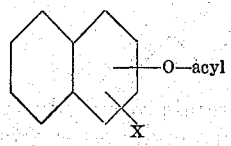

wherein X stands for hydrogen, an alkyl group or a carboxylic ester group, with hydrogen, under superatmospheric pressures and at temperatures between about room temperature to about 110° C. in the presence of a base metal hydrogenation catalyst.

2. A process which comprises treating naphthol esters of the general formula:

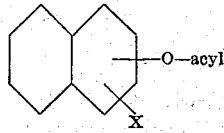

wherein X stands for hydrogen, an alkyl group or a carboxylic ester group, with hydrogen, under superatmospheric pressures and at temperatures between about room temperature to about 110° C. in the presence of a base metal hydrogenation catalyst with the addition of an organic diluent.

3. A process which comprises treating naphthol esters of the general formula:

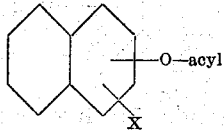

wherein X stands for hydrogen, an alkyl group or a carboxylic ester group, with hydrogen, under pressures between about 20 to about 80 atmospheres and at temperatures between about room temperature to about 110° C. in the presence of a base metal hydrogenation catalyst.

4. A process which comprises treating naphthol esters of the general formula:

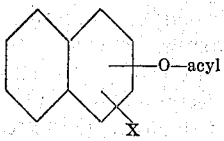

wherein X stands for hydrogen, an alkyl group or a carboxylic ester group, with hydrogen, under pressures between about 20 to about 80 atmospheres and at temperatures between about room temperature to about 110° C. in the presence of a base metal hydrogenation catalyst with the addition of an organic diluent.

5. A process which comprises treating naphthol esters of the general formula:

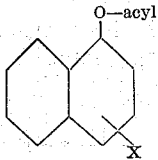

wherein X stands for hydrogen, an alkyl group or a carboxylic ester group, with hydrogen, under pressures between about 20 to about 80 atmospheres and at temperatures between about room temperature to about 110° C. in the presence of a base metal hydrogenation catalyst.

6. A process which comprises treating naphthol esters of the general formula:

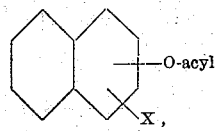

wherein X stands for hydrogen, an alkyl group or a carboxylic ester group, with hydrogen, under superatmospheric pressures and at temperatures between about room temperature to about 110° C. in the presence of a base metal hydrogenation catalyst, and saponifying the hydroxy-ar-tetra-hydronaphthalene esters thus formed of the general formula:

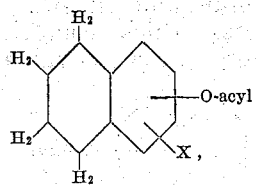

wherein X stands for hydrogen, an alkyl group or a carboxylic ester group.

7. A process which comprises treating naphthol esters of the general formula:

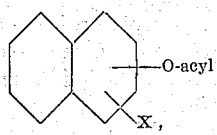

wherein X stands for hydrogen, an alkyl group or a carboxylic ester group, with hydrogen, under superatmospheric pressures and at temperatures between about room temperature to about 110° C. in the presence of a base metal hydrogenation catalyst with the addition of an organic diluent, and saponifying the hydroxy-ar-tetra-hydronaphthalene esters thus formed of the general formula:

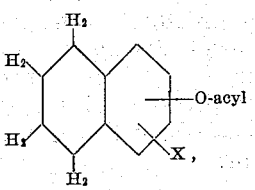

wherein X stands for hydrogen, an alkyl group or a carboxylic ester group.

8. A process which comprises treating naphthol esters of the general formula:

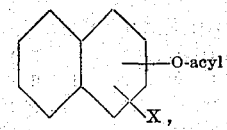

wherein X stands for hydrogen, an alkyl group or a carboxylic ester group, with hydrogen, under pressures between about 20 to about 80 atmospheres and at temperatures between about room temperature to about 110° C. in the presence of a base metal hydrogenation catalyst and saponifying the hydroxy-ar-tetra-hydronaphthalene esters thus formed of the general formula:

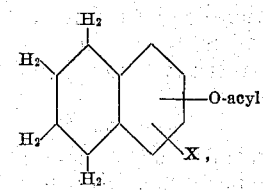

wherein X stands for hydrogen, an alkyl group or a carboxylic ester group.

9. A process which comprises treating naphthol esters of the general formula:

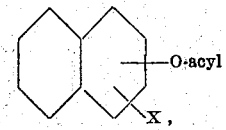

wherein X stands for hydrogen, an alkyl group or a carboxylic ester group, with hydrogen, under pressures between about 20 to about 80 atmospheres and at temperatures between about room temperature to about 110° C. in the presence of a base metal hydrogenation catalyst with the addition of an organic diluent and saponifying the hydroxy-ar-tetra-hydronaphthalene esters thus formed of the general formula:

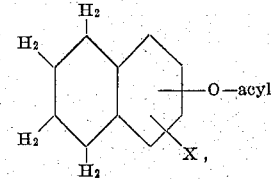

wherein X stands for hydrogen, an alkyl group or a carboxylic ester group.

10. A process which comprises treating naphthol esters of the general formula:

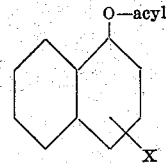

wherein X stands for hydrogen, an alkyl group or a carboxylic ester group, with hydrogen, under pressures between about 20 to about 80 atmospheres and at temperatures between about room temperature to about 110° C. in the presence of a base metal hydrogenation catalyst and saponifying the hydoxy-ar-tetra-hydronaphthalene esters thus formed of the general formula:

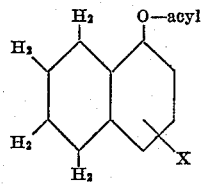

wherein X stands for hydrogen, an alkyl group or a carboxylic ester group.

11. As new compounds the 1-hydroxy-ar-tetrahydro-naphthalene esters corresponding to the general formula:

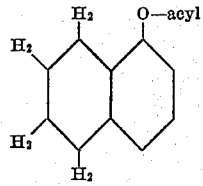

which compounds are colorless crystallized substances having a definite melting point, soluble in organic solvents, insoluble in water, capable of being saponified to 1-hydroxy-ar-tetrahydronaphthalene.

12. As a new compound, the acetate of ar-1-hydroxy-tetrahydronaphthalene of the formula:

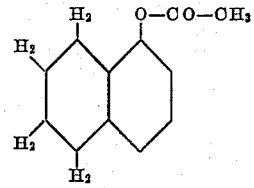

representing in a pure state snow-white crystals melting at 73 to 75° C.

13. As a new compound, the benzoic acid ester of ar-1-hydroxy-tetrahydronaphthalene of the formula:

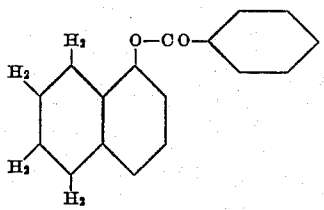

crystallizing from benzine or methyl alcohol in small brilliant tablets melting at about 46° C.

In testimony whereof I affix my signature.
ERNST KORTEN.